United States Patent [19]

Denckert

[11] 4,425,016
[45] Jan. 10, 1984

[54] ELECTRIC TERMINAL BOX

[76] Inventor: Lennart H. Denckert, Ekebyvägen 177, Vallentuna, Sweden, S-186 00

[21] Appl. No.: 305,645
[22] PCT Filed: Jan. 30, 1981
[86] PCT No.: PCT/SE81/00029
  § 371 Date: Sep. 17, 1981
  § 102(e) Date: Sep. 17, 1981
[87] PCT Pub. No.: WO81/02225
  PCT Pub. Date: Aug. 6, 1981

[30] Foreign Application Priority Data
  Feb. 1, 1981 [SE] Sweden .................. 8000817

[51] Int. Cl.³ ............... H01R 13/639; H01R 13/514; H01R 13/26
[52] U.S. Cl. ..................... 339/82; 174/59; 339/176 M; 339/245; 361/373
[58] Field of Search ......... 339/33, 32, 176 M, 82; 174/59; 361/372, 373

[56] References Cited

U.S. PATENT DOCUMENTS 2,861,120 11/1958 Park ........................ 174/59
3,662,321 5/1972 Bury ........................ 339/176 M
3,740,697 6/1973 Van Son ................... 339/276 A

FOREIGN PATENT DOCUMENTS 1023808 2/1958 Fed. Rep. of Germany .
1267743 9/1968 Fed. Rep. of Germany .
1213303 3/1960 France .
 89519 4/1937 Sweden .
163901 6/1957 Sweden .
114987 8/1926 Switzerland .

Primary Examiner—Joseph H. McGlynn
Assistant Examiner—Paula Austin
Attorney, Agent, or Firm—Holman & Stern

[57] ABSTRACT

Electric terminal box, including connecting pins (6, 6', 6") extending from the bottom surface of the terminal box housing (1) in direction towards the open portion of the housing (1), arranged to facilitate connection of electric wires inserted into the terminal box, also arranged to establish electrical connection with tubular connecting means (14), located in a corresponding configuration at the electrical switch, power point or similar component intended to be arranged in a position mainly surrounded by the housing (1), the component, when inserted into the terminal box establishing electrical contact via the connecting pins (6, 6', 6") to the electrical wires inserted into the terminal box. The connecting pins (6, 6', 6") are preferably attached to a base plate (5), rotatably mounted adjacently to the internal bottom surface of the housing (1), and arranged lockable in desired angular rotary positions in relation to the housing (1) by means of a locking member (10, 11), co-acting with the housing (1). The component to be attached, and electrically connected, is preferably arranged with a locking means (15, 16), co-acting with the housing (1) or a separate co-acting member (9), in order to facilitate securing of the component in desired relative position to the internal bottom surface of the housing (1), the members (9, 15, 16) preferably being arranged only to facilitate unlocking by use of a special purpose tool.

7 Claims, 5 Drawing Figures

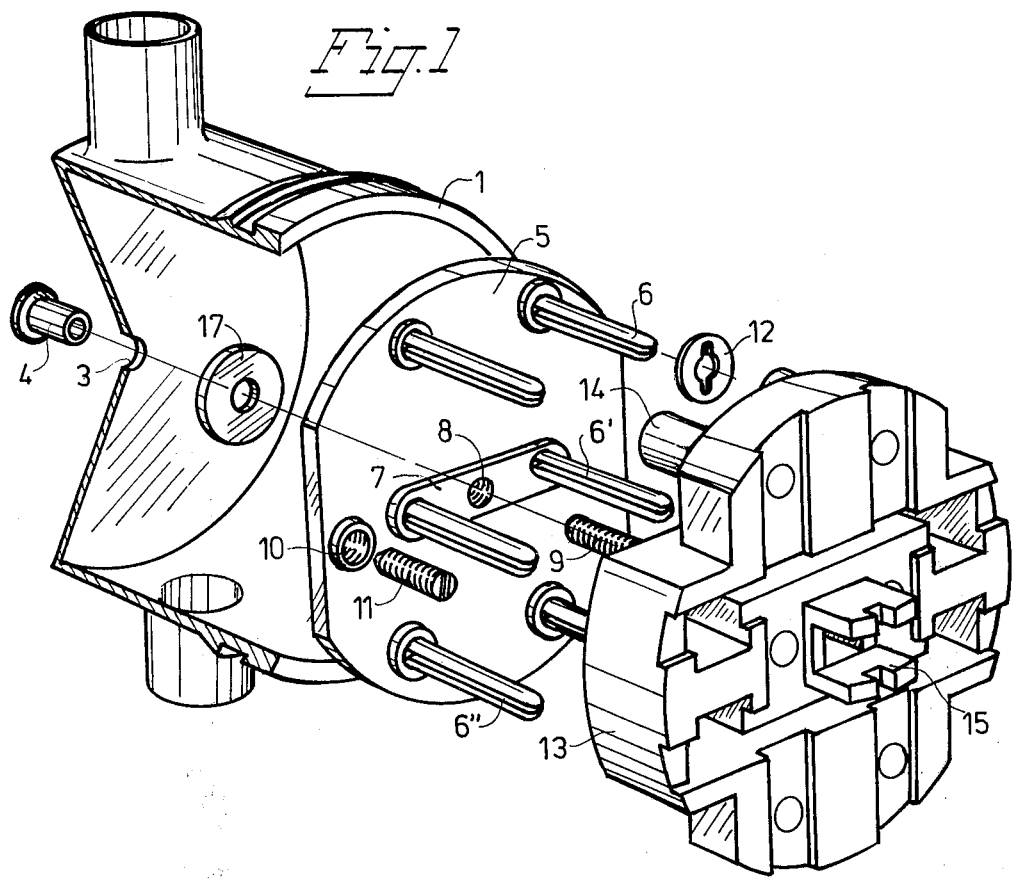
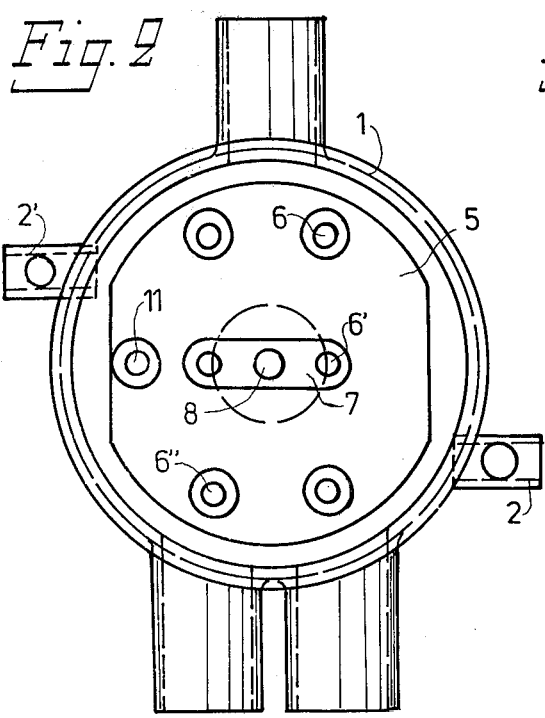
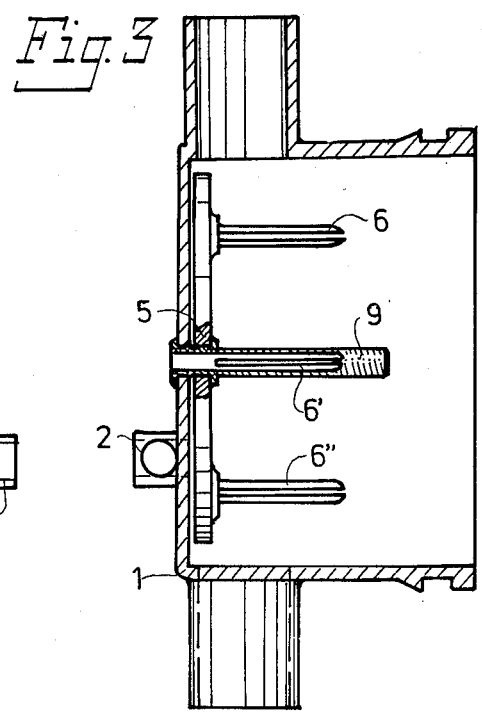

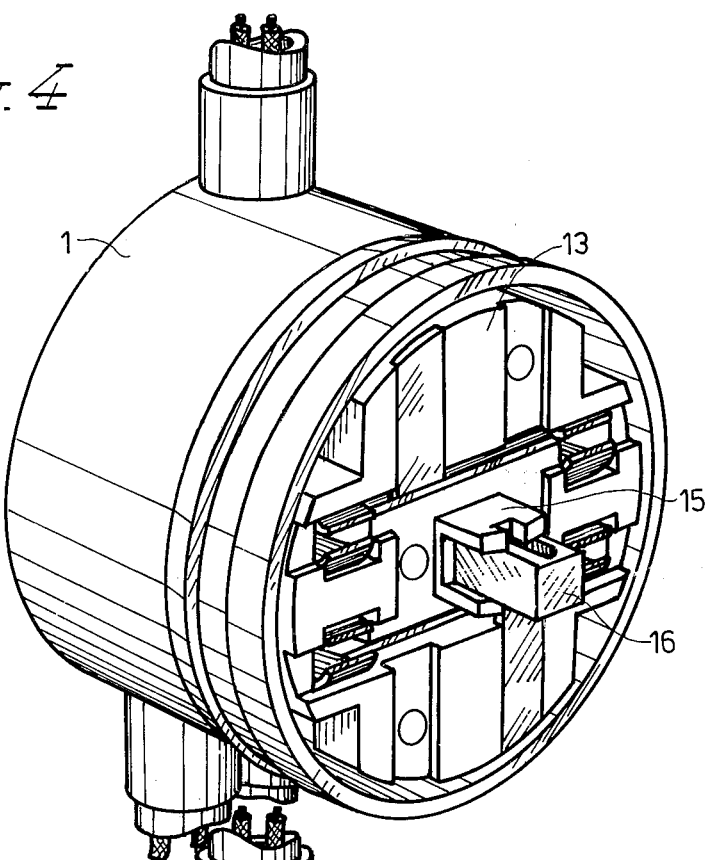
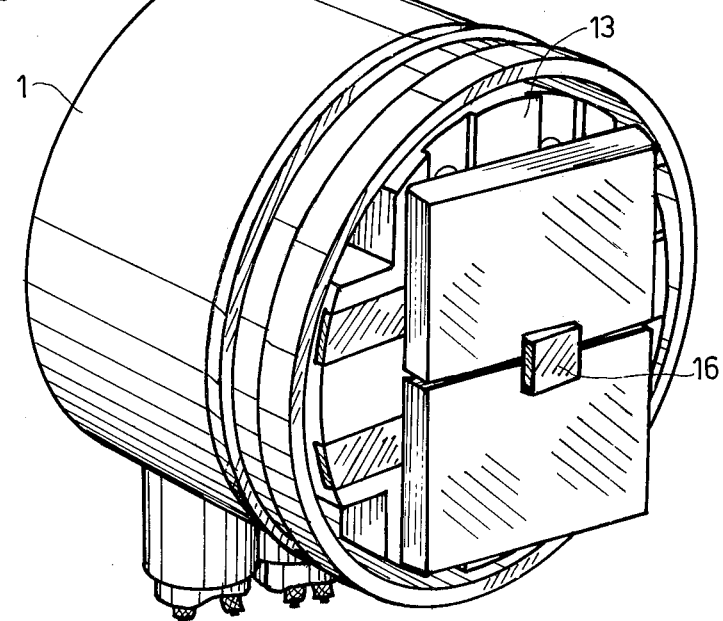

ELECTRIC TERMINAL BOX

Priority is claimed from International Appln. PCT/SE81/00029 filed Jan. 30, 1981.

BACKGROUND OF THE INVENTION

The present invention relates to an electric terminal box, intended to faciliate an improved method of connection, both with regard to electrical wires extending to the terminal box as well as electrical switch or contact means, wall mounted power points or sockets, and other similar components attached to the terminal box.

Existing types of electric terminal boxes are attached in a wall unit of a building in a previously known fashion by means of nails or other suitable means, or moulded into the wall, and they are joined to each other, or to an electric distribution panel, by means of pipes, into which electrical wires are insertable. When erecting a building, said installation is carried out as a first step, after which an electrician usually performs the wiring operation to the electric terminal boxes as a second step. After this operation, it is desirable to perform necessary decorating operations such as papering and painting. Connection and attachment of the components such as electrical switching or contact means, wall mounted power points or sockets or similar components to the terminal boxes is performed as a third and separate step. The components are attached according to an electrical circuit diagram, and the length of each wire terminated in a terminal box is trimmed by the electrician, after which the same are connected to a screw terminal forming a part of each component. The component, thus electrically connected, is thereafter attached to the terminal box by turning two screws at the component, which cause two pivoting abutment members to make contact with the internal cylindrical wall surface of the terminal box. As a final step, a covering and protecting lid is attached, having holes or recesses for a manually operable switch means, or intended to faciliate insertion of a power plug. Said lid can either be attached by means of screws, or by means of spring members extending from the lid, which faciliate a frictional grip against the component attached to the terminal box.

The above described method of attachment, and associated components, can serve as an example of the type of components, and the attachment method, presently generally used. However, it is obvious, that this method, and associated components, cause a time-consuming attachment operation and a difficult wiring operation, particularly since wiring is followed by identification and connection of the wires and these operations are performed as two steps, separated in time. Both these operations are of such a nature, that qualified electricians must be used, in order to obtain full security for correct wiring and connection to associated components, such as switches, power points or sockets, or similar. When both of these operations are performed, it is necessary to accurately follow an electrical circuit diagram, to ensure correct electrical connection. A further disadvantage related to previously known methods of attachment, and associated components, is that switches, power points or sockets, or similar components, often later are exchanged by unauthorised persons, who by means of a screw driver can perform the necessary removal and attachment operations, including electrical connection of the exchanged component. This is extremely undesirable, since incorrect connection, e.g. of an earth protected power point or socket, have caused a number of serious accidents, often fatal.

SUMMARY OF THE INVENTION

The object of the present invention is to remove all the above disadvantages related to electric circuit boxes and associated components as presently used, and the installation time is also considerably reduced, and connection of electrical switches, power points or sockets, and similar components, which as described above is carried out as a final step in the installation operation, can now be carried out extremely fast, and also by other persons than qualified electricians.

A basic embodiment of an electric terminal box according to the present invention is more fully described below, reference being made to the accompanying drawings.

BRIEF DESCRIPTION OF THE DRAWINGS

FIG. 1 is an exploded perspective view of an electric terminal box with an associated wall power point or socket of a two-way type, arranged according to the present invention.

FIG. 2 is a plan view of the terminal box shown in FIG. 1.

FIG. 3 is a cross-sectional view of the terminal box shown in FIG. 2.

FIG. 4 is an electrical terminal box according to FIGS. 1 and 2, in which the base of a two-way type power point or socket is mounted.

FIG. 5 shows the electrical terminal box with associated parts as shown in FIG. 4, but with two manually operable switching members attached (a double electrical switch).

DETAILED DESCRIPTION OF THE INVENTION

The present invention is based on the use of an electric terminal box, slightly modified in relation to existing types. Said electric terminal box includes a mainly conventional housing 1, arranged with the desired number of connections for pipes, through which the electrical wires terminating in the terminal box are insertable. The housing 1 can be arranged in a previously known manner with surrounding grooves, intended to improve attachment when moulded into a concrete wall, and/or attachment members 2, 2′, intended to faciliate attachment of the housing by means of nails or the like. In the bottom portion of the housing 1, a centrally located through hole 3 is arranged, a tubular rivet 4 being arranged extending through said hole 3, thereby joining a bottom plate 5 in a rotable relationship in relation to the housing 1. A washer 17 is also shown located in an intermediate position between said bottom plate 5 and the internal bottom surface of the housing 1. From the bottom plate 5 extends a number of connecting pins 6, 6′, 6″, having a longitudinally extending through slot, said pins being located in pairs separated from each other. The two centrally located connecting pins 6′ are internally electrically connected by means of an interconnecting member 7 located by the base plate 5, said interconnecting member 7 also including a centrally located threaded hole 8, in which a threaded stud 9 is attachable. At a peripheral portion of the base plate 5 a further threaded through hole 10 is located, in which a lock screw 11 is attachable. Against each of the connecting pins 6, 6', 6" a lock washer 12 is attachable, said lock washer 12 having a through hole with a diameter slightly smaller than the outside diameter of the connecting pins 6, 6', 6", and attachment of said lock washer 12 against a connecting pin 6, 6', 6" reduces the width of the longitudinally extending through slot.

The above described electrical terminal block is mounted in a wall unit in a previously known fashion, after which electrical wiring is performed on the installed terminal boxes in accordance with a relevant electrical circuit diagram. However, when said wiring operation is made, connection is also performed to the connecting pins 6, 6', 6", which is a major difference from previous methods. The bottom plate 5 is located by rotation within the housing 1 to a position in accordance with directions given in the circuit diagram, after which the bottom plate 5 is locked in the predetermined position in relation to, for example, the floor surface. It should be mentioned, that the base plate 5 when mounted in the housing 1 preferably is locked by means of the lock screw 11 in a certain predetermined position, which position is suitable for the most common types of installations. The insulation of the free end portions of the electrical wires is removed in a previously known way, after which the end portions are inserted into the through slots of the connecting pins 6, 6', 6". The inserted end portions are thereafter locked in position by pressing a lock washer 12 down over each connecting pin 6, 6', 6" into which an electrical wire has been inserted. This method of connection results in a considerable saving of time for connections made to screw terminals. With regard to the two centrally located connecting pins 6', electrically connected to each other by means of the connecting member 7, such pins are normally utilized for earth connections, with regard to installations requiring a protective earth connection.

When the wiring operation has been performed, and the electrical wires have been connected to the connecting pins 6, 6', 6" in the terminal boxes in a previously described fashion, each electric terminal box is thus electrically connected in accordance with a previously designed electrical circuit diagram, i.e. with the connecting pins 6, 6', 6" located and connected in a predetermined way. When erecting new houses or buildings, necessary decorating operations can now be performed, since it normally is desired to paint or paper the walls before any power points or sockets, switches or similar components, are installed and attached to the electric terminal boxes.

When this work has been carried out, components of the above type should be attached and connected to the terminal boxes. Since necessary wiring and connection to the connecting pins 6, 6', 6" has already been performed, the final attachment stage can now be performed extremely simply and in a minimum of time. The components attached are slightly modified in relation to presently used types of switches, power points or sockets, and similar components, in order to faciliate attachment and connection to the connecting pins 6, 6', 6" surrounded by the housing.

With reference to FIG. 1, an example of such a modified component is shown, being a two-way wall mounted power point or socket. Said power point or socket includes a mainly conventional electrically insulating body 13, and also a number of tubular connecting means 14, extending towards the base plate 5, located in a configuration which corresponds to the connecting pins 6, 6', 6". When the body 13 is inserted into the housing 1, said tubular connecting means 14 are arranged to embrace the connecting pins 6, 6', 6", and thus establish an electrical connection with same. The tubular connecting means 14 are thus arranged having an internal diameter slightly smaller than the outside diameter of the connecting pins 6, 6', 6", preferably arranged with one or a number of longitudinally extending through-slots intended to improve the electrical contact properties between the tubular connecting means 14 and the connecting pins 6, 6', 6".

The stud 9 extending from the base plate 5 in direction towards the body 13 is utilized to accomplish secure attachment of the body 13 to the terminal box, and in order to faciliate location of the body 13 in a position related to the wall surface. Attachment against the stud 9 is performed using a special purpose tool for influencing a part 15, centrally located and protruding from the electrically insulating body 13, which moves a locking member, surrounded by the body 13 and co-acting with the external screw thread on the stud 9. When the body 13 has been located in desired position in relation to the adjacent wall surface, a U-shaped member 16 is inserted into the part 15, having interlocking means co-acting with the external screw thread on the stud 9. A joint is thus formed, which cannot be influenced without special purpose tools, i.e. authorized persons are unable to remove the protective part 16, and even if this was possible, a further type of special purpose tool would be required to influence the locking member located surrounded by the electrically insulating body 13.

A protective outside lid (not shown) is thereafter attached. The attachment of the lid can be performed in many previously known ways, e.g. by means of spring members, co-acting with the terminal box or the insulating body 13, and obviously also by means of screws, even though the latter type of attachment increases the installation time.

The final installation, performed as described above, results in a considerable saving of time compared with the installation time for components having screw terminals, in which case it also is extremely important that qualified personnel used, in order to secure correct installation of the components. When using components according to the present invention, which only are inserted into the terminal box and locked in desired position to an adjacent wall surface, the time for final installation is obviously considerably reduced, and also simplified. This is since only a list of existing terminal boxes are required, including information for each terminal box regarding the type of component to be attached.

The bottom plate 5, as shown, preferably includes two parallel edge portions, whereby rotation of the base plate 5 to desired position in relation to the floor surface is simplified. The edge portions may also be used co-acting with spring members extending from the protective cover attached covering the component attached to the electric terminal box. Furthermore, a washer 17 is preferably arranged located between the base plate 5 and the internal bottom surface of the housing 1, as shown in FIG. 1.

It should also be emphasized, that described and shown embodiments obviously can be modified in a number of ways, while maintaining the important and characteristic features of the present invention. The number of connecting pins 6, 6', 6" can thus be varied, even if the number in the described and shown embodiment is sufficient for most applications. Furthermore, the attachment of electrical wires to the connecting pins 6, 6', 6" can also be accomplished in other known ways, e.g. by arranging the connecting pins 6, 6', 6" with through holes, into which the wires are insertable, locked in position by means of screws, along the connecting pins 6, 6', 6" slidable and lockable means, or the like. The electrical insulating body 13 can obviously also be attached to the terminal box in the other ways than described, e.g. by use of other types of locking means co-acting with the stud 9, or by arranging the body 13 with locking means, arranged to take up contact against the internal peripheral wall of the housing 1.

Important and characteristic features of the present invention are, that the housing 1 is arranged with connecting pins extending from the bottom plane, arranged to faciliate connection of electrical wires terminated in the terminal box, and that said connecting pins 6, 6', 6" are utilized to accomplish electric connection with the component to be attached to the terminal box, said component including a number of tubular connecting means 14, arranged to establish electric contact with the connecting pins 6, 6', 6" when the component is inserted into the terminal box, thereby accomplishing a predetermined function.

The present invention is thus in no way restricted to the shown and described embodiment, which only is intended to serve as an example of an embodiment within the scope of the inventive thought.

I claim:

1. An electrical terminal box comprising:
   a housing having an internal bottom surface, an opposing open end, and at least one opening for the insertion of an electrical wire;
   a base plate rotatably mounted within said housing adjacent to its internal bottom surface;
   locking means for locking said base plate in a desired angularly rotated position in relation to the housing;
   a plurality of parallel connecting pins extending outward from the base plate toward the housing open end, each pin having a longitudinally extending slot adapted to receive an inserted electrical wire;
   clamping locking means for locking an electrical wire after insertion into said slot; and
   an outer insulating body removably mounted within the housing open end over the base plate, having tubular connecting means for snugly fitting over each of said connecting pins for establishing an electrical connection with electrical wires that are inserted in the connecting pin slots.

2. The terminal box of claim 1 wherein the insulating body includes locking means for locking the insulating body and other components within the housing, in a desired position in relation to the housing internal bottom surface.

3. The terminal box of claim 2 wherein the insulating body locking means comprises a stud having an external screw thread for insertion into a threaded hole passing through said insulating body, said bottom plate, and said housing, and a locking member is screwed on to the outward end of said stud, said locking member being screwable only by the use of a special purpose tool.

4. The terminal box of claim 1, 2 or 3 wherein at least two of said connecting pins are internally electrically connected to each other by means of a connecting member.

5. The terminal box of claim 4 wherein the connecting pins are arranged in such a configuration that the insulating body can only be attached by its respective tubular connecting means in a predetermined position relative to the connecting pins.

6. The terminal box of claim 5 wherein the base plate has a mainly disc-shaped circular configuration from which at least one peripheral portion is removed.

7. An electrical terminal box comprising:
   a housing having an internal bottom surface, an opposing open end, and at least one opening for the insertion of an electrical wire;
   a base plate rotatably mounted within said housing adjacent to its internal bottom surface;
   locking means for locking said base plate in a desired angularly rotated position in relation to the housing;
   a plurality of parallel connecting pins extending outward from the base plate toward the housing open end, each pin having a hole extending transversely to its length axis for receiving an electrical wire;
   clamping means for locking an electrical wire after insertion into said connecting pin hole; and
   an outer insulating body removably mounted within the housing open end over the base plate, having tubular connecting means for snugly fitting over each of said connecting pins for establishing an electrical connection with electrical wires that are inserted in the connecting pin holes.

* * * * *